United States Patent [19]

Wilke

[11] 4,294,862
[45] Oct. 13, 1981

[54] PROCESS FOR THE PRODUCTION OF PASTRY AND FLAKY PASTRY-LIKE PRODUCTS

[76] Inventor: Gerhard Wilke, Holderlinweg 1, 6900 Heidelberg, Fed. Rep. of Germany

[21] Appl. No.: 138,849

[22] Filed: Apr. 10, 1980

Related U.S. Application Data

[63] Continuation-in-part of Ser. No. 76,994, Sep. 19, 1979, which is a continuation of Ser. No. 873,889, Jan. 31, 1978, abandoned.

[51] Int. Cl.³ .................... A21C 9/08; A21D 13/08
[52] U.S. Cl. .................... 426/502; 426/94; 426/144; 426/272; 426/556; 99/450.2
[58] Field of Search ............... 426/501, 517, 496, 502, 426/275, 556, 94, 465, 391, 458, 451, 144, 272, 297; 425/384, 363; 99/450.2, 450.4, 450.6, 450.7

Primary Examiner—Joseph M. Golian
Assistant Examiner—Elizabeth J. Curtin
Attorney, Agent, or Firm—Staas & Halsey

[57] ABSTRACT

A process and apparatus for producing pastry and flaky pastry-like products wherein the starting mixture passes through a series of rollers wherein each succeeding roller moves faster than its preceding roller and the fleece-like film developed thereby is conducted to a variable speed conveyor belt wherein the ratio of the speed of the belt to the speed of the last roller is adjusted to expose the fleece-like film to a mechanical undulating effect, the film thereafter being dried. The temperature of the rollers is maintained at a predetermined precise low level within a range of 1° C. as a result of circulating brine or other liquid through the roller mechanisms.

9 Claims, 6 Drawing Figures

PROCESS FOR THE PRODUCTION OF PASTRY AND FLAKY PASTRY-LIKE PRODUCTS

CROSS-REFERENCE TO RELATED APPLICATIONS

This is a Continuation-in-Part Application of Application Ser. No. 076,994 filed Sept. 19, 1979 which is a Continuation Application of Application Ser. No. 873,889 filed Jan. 31, 1978 and now abandoned.

BACKGROUND AND SUMMARY OF THE INVENTION

Processes for producing pastry and flaky dough-like products, are known in the art wherein the starting mixture or dough is subjected to a multiple rolling facility, wherein each succeeding roller moves faster than its preceding roller, i.e., each roller has a "lead" compared to its preceding roller, to produce a fleece-like film (un-orientated layers of fibrous material) which thereafter is conducted to a variable speed belt wherein the ratio of the speed of the belt to that of the last roller is adjusted to thereby expose the fleece-like film to a mechanical undulating effect, the film thereafter being dried. Such methods permit greater freedom and diversity in the production of pastries and flaky pastry-like products. That is, where compared with known devices for preparing pastries and flaky, pastry-like products, the variability of the ingredients of the present products can be multiplicated. It is possible according to the present invention to use a dough which has no fatty content, but which has a albumen content up to 60%. On the other hand, it is possible to use a dough which has a fatty content up to 50%. These benefits are achieved by the present invention because of the low roller temperature range of 3° C. to 20° C., and the precise temperature control of the respective rollers within a 1° C. range.

In the devices of the known art it was not possible to use such a variability of doughs. In accordance with such known processes it is possible, for example, to quickly increase the percentage of albumen in pastry-like products to high percentages, as compared with prior methods, and to simultaneously decrease the fatty portion. Despite the advantages of the foregoing processes, certain problems arise when the fatty portion in the pastry is greatly increased and when the water content exceeds certain percentages.

It has now been discovered that, by adjusting the temperature of the rollers, particularly in the lower temperature ranges of 3° to 20° C., the aforementioned problems of previous processes pertaining to the limitation of fat and water content may be solved.

In accordance with the present invention, the rollers operate at precisely defined temperatures which are adjusted, for example, by as little as 1° C. This precise adjustment of the temperature range of the rollers is in contrast to the prior technique of the water cooling of the rollers for the limited purpose of reducing heat caused by the friction of the rollers in that with the invention disclosed herein it is sought to maintain the surfaces of the rollers at a precise temperature.

DESCRIPTION OF THE PREFERRED EMBODIMENT

Figure 1:
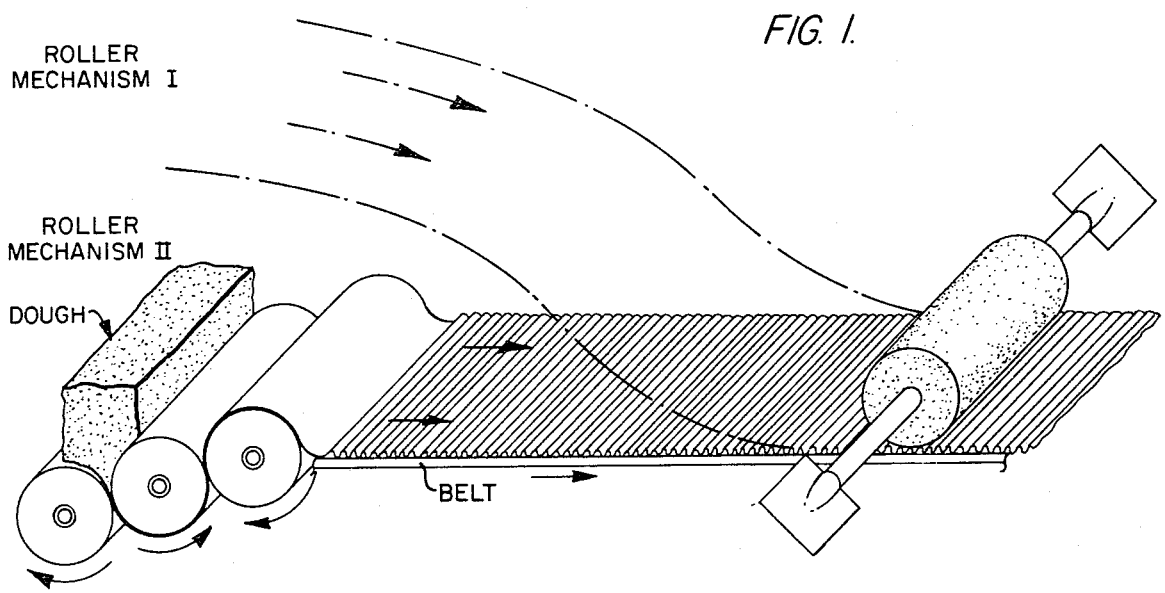
FIGS. 1 and 2 are perspective views of the roller assemblies of the present invention.
Figure 1A:
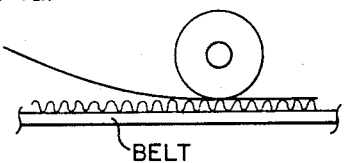
FIGS. 1A and 2A are fragmentary side elevations of the pressure roller of FIGS. 1 and 2 respectively.

With reference to the drawings, FIG. 1 shows the process for producing pastry wherein the smooth fleece-like film produced from roller mechanism I is combined with the undulated film as produced by roller mechanism II by being combined with a pressure roller.

Figure 2:
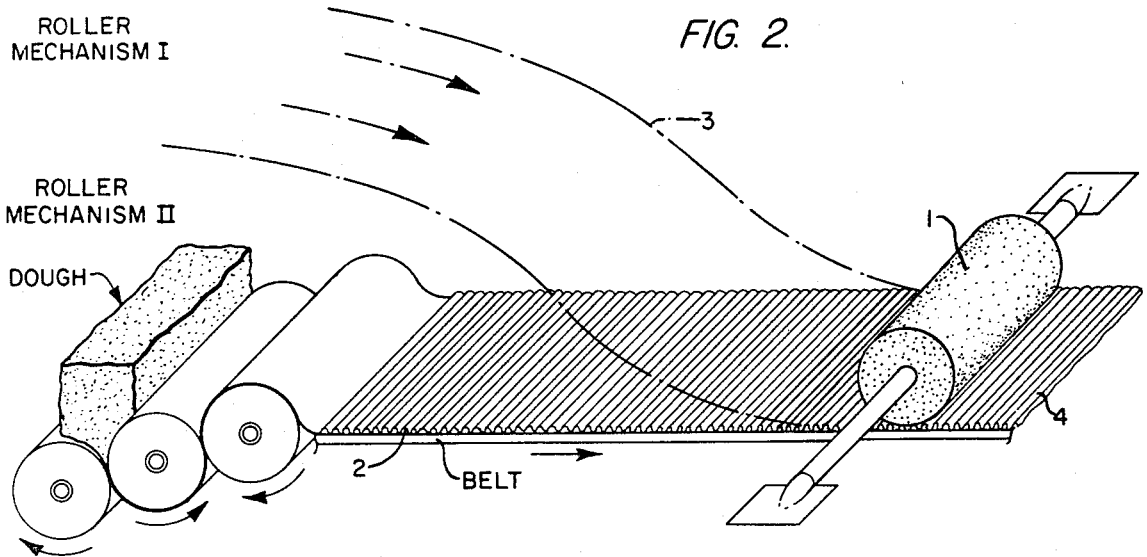
Figure 2A:
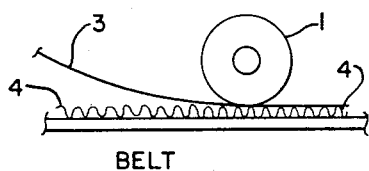

FIG. 2 is a similar view wherein the pressure roller for combining the pastry films from roller mechanism I and II respectively is a foam rubber roller. In FIG. 2 this foam rubber roller is indicated by reference numeral 1, the corrugated film from roller mechanism II is indicated by reference numeral 2, the smooth film from roller mechanism I is indicated by reference numeral 3, and the combined corrugated and smooth film is indicated by reference numeral 4.

Figure 3:
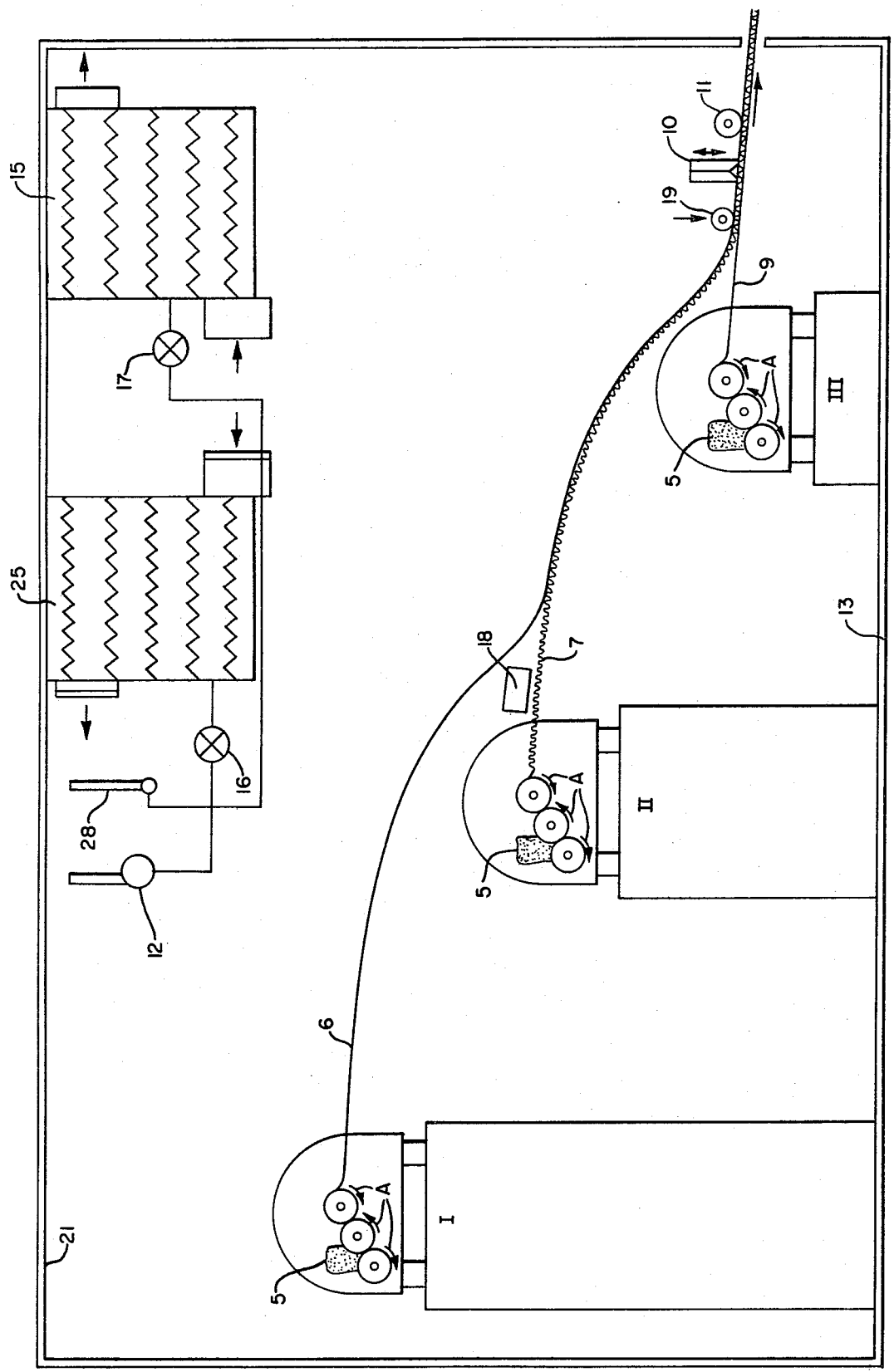
FIG. 3 is a side elevational view of the roller assemblies and the brine circulating mechanism associated therewith.

Looking at FIG. 3, three sets of roller plants, I, II and III are shown mounted upon a support foundation 13. The precisely temperature controlled rollers rotate in the direction of small arrows indicated by reference character A. Each roller plant has a feeding hopper 5 input associated therewith. The roller plant I outputs a smooth, flexible film 6; the roller plant II outputs a corrugated film 7, and the roller plant III outputs another smooth film 9. A foam rubber roller 19, as shown in FIG. 3, is used to combine the three films. A chopping knife 10 is provided after the foam rubber roller 19 for cross-cutting the combined pastry. A roller knife 11 longitudinally cuts the combined pastry. A shaking beam 18 is preferably provided for the spreading on of sesame seeds onto corrugated film 7 prior to the combination of the other films therewith. An overall housing 21 permits the operating environment to be closely controlled. An air dehumidifier 25 and an air cooler 15 are normally associated with the housing 21. The air dehumidifier has a switching device 16 under control of a hygrometer 12. Similarly, the air cooler has a switching device 17 under the control of the thermostat or thermometer 28.

Figure 4:
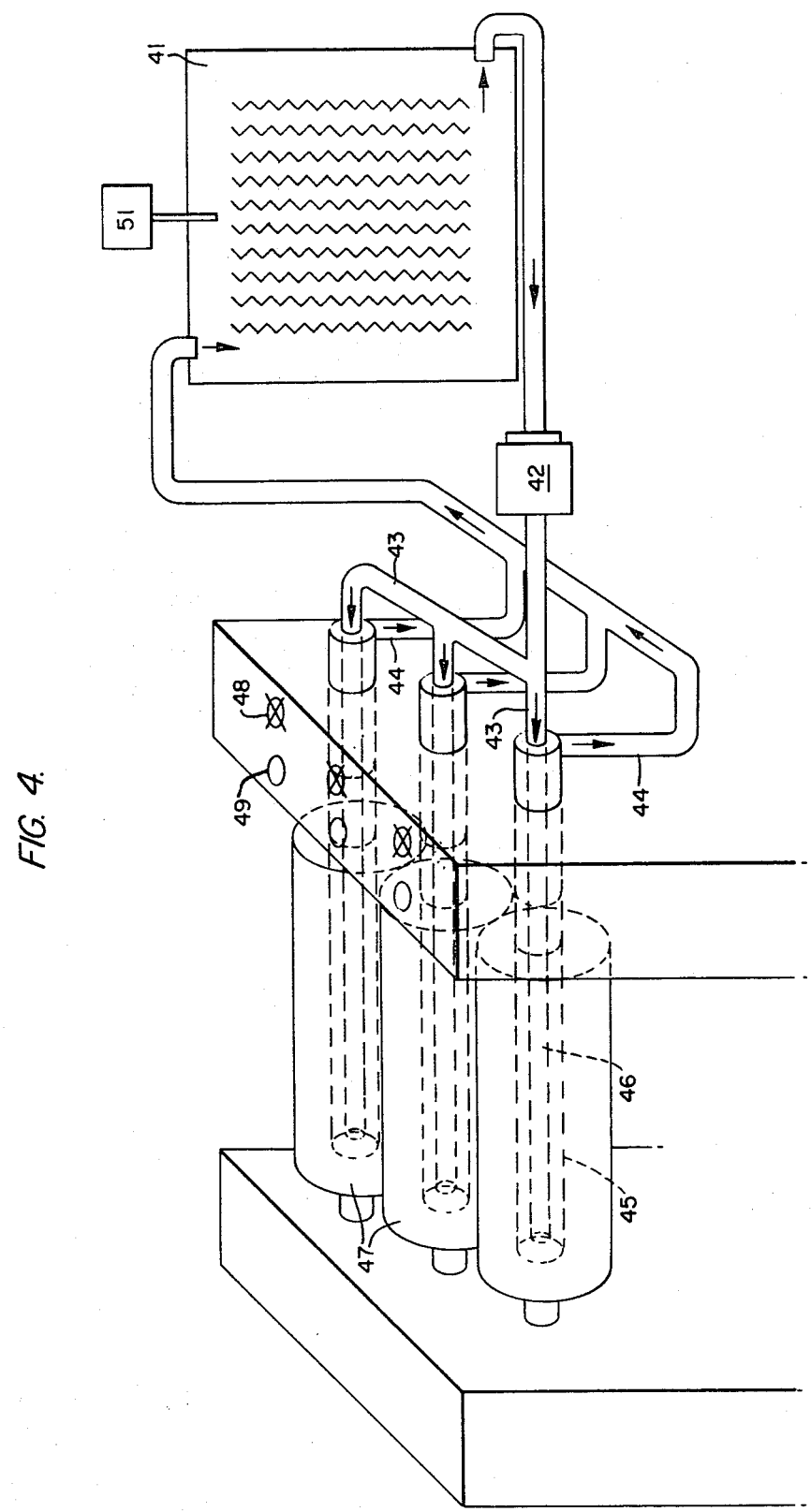
FIG. 4 is a perspective view of the roller assemblies and the brine circulating mechanism associated therewith.

FIG. 4 shows a single roller frame as designed for circulation of the cooling agent. Reference numeral 41 indicates a plate pipe for the brine or other cooling agent, reference 42 indicates the circulating pump for the cooling agent, 43 indicates an injection pipe while 44 indicates an exit pipe for the cooling agent. 45 indicates the return pipe for the cooling agent in the inside of the roller while 46 indicates the inlet pipe for the cooling agent in the inside of the roller. 47 indicates the roller surface which is maintained at the precise temperature. 48 indicates schematically hydraulic fine adjustment wheels for changing the pressure exerted by the rollers in conventional manner. 49 indicates a temperature recorder, and 51 indicates a thermostat used for the adjustment of the precise cooling agent temperature.

In accordance with the principles of the present invention the temperature of the rollers is precisely controlled. Large quantities of brine at predetermined, adjusted temperatures are permitted to circulate through the roller assemblies, as seen in FIGS. 3 and 4.

It will be apparent that the use of large amounts of brine makes it possible to decrease the differential between the input and output temperatures which is advantageous. Thus, it is possible to control the temperature of the brine which is entering the inner volume of the roller-body and the control of the temperature of the brine which is leaving the roller-body. Instead of using brine, i.e., which is an aqueous solution of an inorganic substance, preferably a salt; it is also possible to use an organic heat carrier, for example, a multivalent alcohol.

With the present invention, where large quantities of precooled or heated brine, adjusted in temperature, are circulated through the roller assemblies, the surfaces of the rollers are maintained precisely at the same temperature within a 1° C. range, in addition to reducing the heat of friction. A fine film is thereby developed on the last of the rollers which is thereafter folded into a ribbon 3 or 4 mm thickness, for example, and cut or punched into pieces in the customary manner, and finally dried. The result is to preserve the flavor of the cheese as a result of the low drying or baking temperature, and to improve the taste of the pastry as compared to products made by conventional processes.

In accordance with one embodiment of the present invention two roller assemblies are used; in both roller assemblies each succeeding roller moves faster than its preceding roller. The speed of the take-off belt of one of the rolling assemblies equals the surface speed of the last roller. By "surface speed" is meant the velocity of a certain point on the roller surface per minute in meters per inch. Where this arrangement is utilized, the result is to achieve a smooth almost greaseless fleecy film. In the second rolling assembly, an undulated, folded fleecy film is produced by the fact that the take-off-belt moves more slowly than the last roller. From the belt of the first roller plant the smooth fleecy film is transferred to the undulating folded fleecy film on the belt of the second roller plant such that one ribbon is formed which consists of two components, namely, the underside which consists of the undulated, folded fleecy ribbon of the second roller aggregate and the upper side which consists of the smooth or stretched fleecy ribbon of the first roller aggregate. The two-component fleecy film formed in this manner may be cut to size, for example, into pieces 100 by 200 mm, without being deformed after drying or baking.

In accordance with a further embodiment of the present invention, a three-component fleecy film is produced. In this embodiment a third roller aggregate is provided in which a smooth under-film, analogous to the processing of the first roller aggregate, is produced in the third roller assembly wherein once again the undulating, folded middle film and the smooth upper film are produced. Extremely good dimensional stability, i.e., resistance to breaking, results from such three-component fleece films.

In accordance with a still further embodiment of the present invention the process is carried out in an environment wherein air temperature and moisture is precisely controlled, to thus exclude even the slightest fluctuations in processing temperatures.

The present invention will be further explained with reference to the following examples.

EXAMPLE NO. 1

70 kg of peeled and finely rolled Gouda cheese with 50% fat in the dry substance 35% fat in the dough and 5 kg of hard fat with 20 kg of solubilized wheat flour, 0.20 kg of salt, and 0.40 kg of emulsifier, for example, monoglyceride, were kneaded for five minutes in a so-called "Planeten-Kneter" provided with small comb-like arms and the resulting mass introduced to the roller plant, the rollers thereof operating within the pressure range 10–200 kp, precisely adjusted within a 1° C. range to a temperature of $+3°$ C. (i.e., $\pm 0.5°$ C.) while the room temperature is maintained at 14° C. with 40% relative humidity. A finely closed film was removed from the last roller and folded into a ribbon of 3–4 mm thickness. The ribbon was thereafter cut into pieces and subsequently dried. The cheese pastry resulting therefrom was improved as to taste, this experiment indicating that it is possible according to the principles of the present invention to process starting products with high percentages of fat and with high percentages of albumin.

By precise adjustment of the low roller temperatures (3° C. to 20° C.) to within a 1° C. temperature range, it is possible to increase the portion of fat in the dough to a very high percentage, i.e., up to 40%, or more. Without the low roller temperatures and the precise temperature control thereof, the high fat content being in a fine crystalline form would tend to leave the dough during the intensive mechanical working of the dough during passage of the dough between the rollers. Thus, a decomposing or disintegrating of the dough would take place. The result being that the end product would have a very fatty surface which would become oxidized and rancid very soon.

Very desirable results are obtained by maintaining a fine crystalline structure of high fat content in the dough by this invention of precisely controlled low temperature rollers. It has been discovered that changing the temperature range by only 2° C. can result in the undesirable change of the crystalline structure of the fat in the dough.

EXAMPLE NO. 2

The starting materials, namely, 55 kg of wheat flour, 7 kg of cleaned wheat bran, 10 kg of crushed rye, 11 kg of crushed oats, 12 kg of vegetable albumin, 4 kg of peanut fat, 1 kg of salt, and 0.5 kg of emulsifier, were kneaded into a dough with 35 liters of water. Twenty-five percent of the dough was fed at a room temperature of 20° C. to a first roller plant, the first roller plant running at a speed equal to 25% of the speed of the second roller plant. The preferred temperature of the rollers is 16° C. within a range of 0.5° C. therebelow and 0.5° C. thereabove. Precise temperature control of the rollers is an important feature of the present invention. The take-off belt of the first roller plant had the same speed as the roller surface of the last roller of the first roller plant while the take-off belt of the second roller plant ran at a speed of $33\frac{1}{3}\%$ that of the peripheral speed of the last roller of the second roller plant. As referred to previously in the specification, two fleece-like components were developed, brought together and processed further as a two-component fleece film.

EXAMPLE NO. 3

The same ingredients and methods of operation as set forth in Example No. 2 were used except that 10 kg of sesame seeds per 100 kg of mass (the total mass including all ingredients) were strewn onto the lower undulating fleece-like ribbon by the way of a vibrating screen and feeding tunnel prior to combining the two fleece-like films.

EXAMPLE NO. 4

The same ingredients and method of operation as set forth in Example No. 3 were used, except that after the two fleece-like films were combined, the upper fleece-like film was pressed onto the lower undulated fleece-like film by a foam rubber roller.

EXAMPLE NO. 5

120 kg peeled debittered soya beans having a water content of 14% are mixed with 70 kg peeled and stewed apples, 20 kg cleaned wheat bran, 5 kg dried sugar beet fibers, 20 kg stoned dates, and 12 kg water. The mixture is premashed on a wet crusher to a particle size 3–5 mm. From the total mixture two aliquots are separated each with 1/5 of the mixture, leaving a residual amount of 3/5 of the mass weight. The first aliquot is then sent to a hydraulic triple roller mill with roller advance together with 1/5 of the total weight of the prepared precomminuted mass. During the process, the bottom roller runs at 4 rpm, the second roller at 8 rpm and the third roller at 15 rpm. The contact pressure of the rollers in the lower region between first and second rollers is 40 kp, and in the upper region between second and third roller 65 kp. The surface temperature of the first roller is 12° C., that of the second roller 10° C., and that of the third roller 8° C. 3/5 of the prepared quantity is sent to a second roller mill. Pressures and temperatures of the rollers are identical. However, the speeds of rotation of the rollers are as follows: 15 rpm—bottom roller; 30 rpm—second roller; and 60 rpm—third roller. The remaining 1/5 is sent to a third roller mill whose speed, pressures and surface temperature of the rollers are identical to those of the first roller. The take-up belt which removes the film formed on the first roller runs at a speed only slightly higher than the surface speed of the third roller. The take-up belt of the second roller mill runs at a speed ⅓ slower than the surface speed of the third roller of the second roller mill, resulting in a wavy fleece band. The remaining fifth is sent to the third roller mill, which runs in the same way and from which an identical fleece band is removed as from the first roller mill. The take-up belts lie one above the other in the sequence 1, 2, 3 and are staggered by the length of a roller mill, so that fleece film 1 lies at the bottom, the wavy fleece film in the middle of fleece film 1, and fleece film 3 rests on fleece film 2. The 3 superposed films are then guided through a pressure roller so as to bond them properly with one another. The tape thus obtained is then guided through a cutting and chopping machine which brings the tape to the desired size, e.g., cuts 4 cm wide and 6 cm long. These cuts are sent from the transport belt to a belt of a continuous drier in which they are dried to a residual water content of 5% at a temperature of 90° C., followed by packaging.

EXAMPLE NO. 6

30 kg peeled celery tubers cut to a width of 55 mm and a thickness of 3 mm and which have been provided to a residual water content of 30% are mixed with:

25 kg leek leaves having a residual humidity of 20%, and 100 kg peeled, debittered soya beans having a residual humidity of 14%, and with 5 kg pulverized dry chicken protein, 2 kg sodium chloride, 500 g of a mixture of dried pot-herbs, 50 g ground pepper, and 6 kg water; and then premasticated in a kneading machine for one hour and thereafter, as described in Example No. 1, sent to the roller mills and processed appropriately. For consumption, the product obtained after drying is poured in a pan with three times the amount of boiling water, then heated for 2 minutes, and is then ready for consumption.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

I claim:

1. A process for producing pastry and flaky pastry-like products from a starting mixture, comprising subjecting said mixture to rollers arranged in series, each succeeding roller moving faster than the preceding roller, while precisely controlling within a range of 1° C. the temperature of said rollers at a low temperature of 3° C. to 20° C., producing a fleece-like film on the last of said rollers, thereafter conducting said fleece-like film to a belt, including adjusting the ratio of the linear speed of said belt to the rotational speed of said last roller for imparting a mechanical undulating effect to said fleece-like film, and drying said film.

2. A process as in claim 1, wherein said precise control of the temperature of said rollers is accomplished by circulating large quantities of brine at predetermined temperature through said rollers.

3. A process as in claim 2, wherein said quantities of brine are sufficiently large to insure constant inlet and outlet temperatures.

4. A process as in claim 1, wherein the precise control of the temperature of said rollers is accomplished by circulating large quantities of organic liquids of predetermined temperature through said rollers.

5. A process as in claim 1, wherein said rollers comprise two roller plants, the speed of said belt being equal to the surface speed of the last roller of said first roller plant so as to develop a smooth fleece-like ribbon, and wherein the speed of said belt of said second roller plant differs from the surface speed of said last roller of said second roller plant such that an undulated, folded film develops, said films thereafter being brought together to define a two-component film.

6. A process as in claim 5, wherein said rollers further comprise a third roller plant, and wherein the speed of the belt of said second roller plant differs from the surface speed of the last roller of said second roller plant thereby producing an undulated folded fleece-like film, and wherein the belts of said first and third roller plants move at the same speed as the surface of the last roller of said first roller plant and said third roller plant thereby obtaining smooth ribbons, the three fleece-like ribbons being produced thereafter being brought together into a three component fleece-like ribbon constructed as a sandwich, said undulated folded fleece-like ribbon being disposed in the middle thereof.

7. A process as in claim 1, further comprising controlling the temperature of the air of the environment within which said process is performed.

8. A process as in claim 6, further comprising pressing the upper film with a foam rubber roller onto the undulated film disposed thereunder.

9. A process for producing pastry and flaky pastry-like products from a starting mixture of dough containing up to 50% fat, comprising:

subjecting said mixture to low temperature of controlled rollers arranged in series and at a temperature of 3° to 20° C., each succeeding roller moving faster than the preceding roller, while precisely controlling within a 1° C. range the low temperature of said rollers, producing a fleece-like film on the last of said rollers, thereafter conducting said fleece-like film to a belt, adjusting the ratio of the linear speed of said belt to the rotational speed of said last roller for imparting a mechanical undulating effect to said fleece-like film, drying said film, said rollers comprising first and second roller plants, the speed of the belt of the first roller plant being equal to the surface speed of the last roller of the first roller plant so as to develop a smooth fleece-like ribbon, and wherein the speed of the belt of the second roller plant differs from the surface speed of the last roller of the second roller plant such that an undulated, folded, fleece-like film develops, the films thereafter being brought together to define a two-component film.

* * * * *